Patented Mar. 21, 1933

1,902,204

UNITED STATES PATENT OFFICE

FOORD VON BICHOWSKY, OF GLENDALE, CALIFORNIA

PROCESS OF PRODUCING PIGMENTS CONTAINING TITANIUM

No Drawing.   Application filed June 10, 1931.  Serial No. 543,385.

The present invention relates especially to the formation of complex or composite titanium pigments, in which a molecular proportion will exist between the various constituents and has for its object to provide a process of manufacture that is economical and easy of control and that will produce new and commercially valuable pigments containing titanium.

The art of making composite titanium pigments by precipitating titanium compounds onto other bodies is of quite recent date.

The composite titanium pigments now widely used consist of titanium oxide coalesced with and adhering to barium or calcium sulphate. This adherence is brought about by precipitating titanium oxide upon a barium or calcium sulphate base. It can also be caused to occur by calcining a mechanical mixture of titanium oxide and barium or calcium sulphate with or without a binder. A third type of composite titanium pigment is the titanium lithopone which as the name signifies is a lithopone extended with either titanium oxide mechanically worked in or with titanium oxide precipitated on or within the lithopone base.

The amount of titanium in these composite pigments can vary within the widest limits but the more common pigments contain from 15 per cent $TiO_2$, in the case of lithopone, to 65 per cent $TiO_2$, by weight, in the case of the barium sulphate base pigments.

I have now discovered that if composite titanium pigments be made in such a way that there is a molecular proportion between the amount of alkaline earth sulphate and the titanium dioxide present that such pigments approach to the covering power and other advantages of pure titanium dioxide.

I have found that such a molecular proportioning of the titanium oxide and the alkaline earth sulphate or sulphates can best be brought about by decomposing definite titanium alkaline earth sulphate compounds or mixtures of such compounds by heating them or otherwise causing them to react with water or other decomposing agents such as hydroxides, carbonates and other basic alkali metal or alkaline earth metal or ammonium compounds.

The alkaline earth salts $CaSO_4 \cdot Ti(SO_4)_2$ and $SrSO_4 \cdot Ti(SO_4)_2$ as well as $2BaSO_4 \cdot 3Ti(SO_4)_2$ have been known since 1907. (Zeit., f., anorg., Chemie Vol. 54 page 253.) The calcium and strontium compound occur in the form of psuedo cubic crystals while the barium salt forms in needles. It is stated that these materials are decomposed by water and that titanium oxide, or more probably the basic sulphate, is formed.

Up to the present time such compounds could not be used for any commercial purpose for they have only been made on a laboratory scale. The laboratory method consisted in dissolving in a large amount of concentrated sulphuric acid a small amount of the appropriate alkaline earth sulphate and of titanium dioxide and then concentrating the hot sulphuric acid solution of the material. This process is obviously, due to the very slight solubility of the reactants in hot sulphuric acid, of only theoretical interest.

I have discovered that these compounds as well as the magnesium salt, which is soluble in water and which will be described in a future application for Letters Patent, can be easily made by heating together at about 180° C., a mixture of the theoretical amount of titanium oxide and an alkaline earth sulphate together with sulphuric acid. The latter in just sufficient amount to convert all the titanium oxide into the normal sulphate and also to combine with all the alkaline earth sulphates present to change them to the acid sulphates of which $BaSO_4 \cdot H_2SO_4$ is an example.

By this discovery the way is opened to the utilization of these compounds for the preparation of molecular mixtures of titanium dioxide and the alkaline earth sulphates which molecular mixtures can, through heating, be converted into sintered or partly sintered masses that approach to and even are true chemical compounds The chemical substances that I obtain by heating together titanium oxide containing masses with sulphuric acid in the presence of alkaline earth sulphate or sulphates are dense almost dry compounds that mixed with water can be worked up into a paste without however decomposing the titanium sulphate. If, however, this pasty material is further diluted and the solution is heated then the titanium sulphate undergoes hydrolysis and there is obtained a molecular mixture of titanium dioxide and an alkaline earth sulphate or sulphates. Such a molecular mixture upon roasting combines still further through partial or complete sintering and one can thus obtain substances similar, in the case of the calcium salt, to the mineral perofskite $CaO \cdot TiO_2$ in which the $CaSO_4$ replaces the CaO of the perofskite, while in the case of the barium compound one obtains a substance similar to the artificial mineral $2BaO \cdot 3TiO_2$ wherein $BaSO_4$ replaces the BaO.

The titanium content of these molecular pigment compounds calculated as $TiO_2$ varies from approximately 37 per cent by weight in the case of the calcium compound, to about 34 per cent by weight in the case of the barium compound and to approximately 30 per cent by weight in the strontium compound.

One of the principal advantages of my new method of preparation of pigment compounds is that it permits of the formation of new complex pigment bodies as for example: $2BaSO_4 \cdot CaSO_4 \cdot 4TiO_2$ which has a titanium content of approximately 34.5 per cent by weight and a specific gravity of about 4.0.

As an example of the formation of these new molecularly proportioned pigment bodies by my method I give the following:

One grinds together a mixture of 50 grams of anhydrous calcium sulphate and 170 grams of dry blanc fixe ($BaSO_4$) and 140 grams of a crude titanium dioxide containing, by weight, 85.2 per cent $TiO_2$, 2.8 per cent of $Fe_2O_3$, and 12.0 per cent $SO_3$ and when well ground this powder is slowly added, with stirring, to 425 grams of 93 per cent sulphuric acid contained in a tall pyrex glass beaker. The resulting pasty mass is then heated with stirring to about 170° C. An exothermic reaction thereupon takes place and the heating can be discontinued until the temperature falls below 160° C., when the heating should be renewed and the material kept at 170° C., for a total of thirty minutes. The thick viscous material is now allowed to cool then it forms a glossy almost dry but quite hydroscopic mass. When cold 500 cc. of cold water may be added without the material becoming even warm. When the water is added the contents of the beaker can be stirred until a uniform thin paste results. This paste is then saturated with $SO_2$ to convert any ferric iron present to the ferrous state. Iron or magnesium or other reducing agent or means may also be used for this purpose. The so treated material is now hydrolyzed, by heating with or without pressure but preferably with stirring, until practically complete precipitation of the $TiO_2$ has taken place. The resulting complex precipitate is filtered and carefully washed until free of iron salts and of sulphuric acid. The filter cake is dried and then roasted at 940° C., for half an hour. The sintered material is perfectly white and grinds to a smooth powder that has excellent covering power.

It is evident that one can vary the above procedure in a number of ways; for instance one can use gypsum, or other calcium sulphate mineral or even plaster of paris in place of the anhydrous calcium sulphate. For blanc fixe one can substitute ground barytes. Where the cost of sulphuric acid is no drawback or where the value of by products is sufficient to offset the increased cost one can use other compounds of the alkaline earths in place of the sulphate or as additions thereto such compounds or mixtures of them such as the oxide, hydroxide, carbonate, nitrate, nitrite, phosphate, sulphide, sulphite or bisulphate or chloride might be used. In place of the titanium dioxide employed, in the example as given, one may use finely ground rutile, titanium basic sulphate or sulphates, ortho or meta titanic acid or mixtures of them or any titanium compound such as titanium nitride that will give $Ti(SO_4)_2$ when heated with sulphuric acid.

The use of ground barytes or gypsum in the known art of making extended pigments is not practical as the particle size of the ground mineral is too irregular but in my method the heating with sulphuric acid causes these particles to undergo a complete change in structure so that the $BaSO_4 \cdot H_2SO_4$ or its corresponding calcium or strontium compound as formed can chemically combine with the $Ti(SO_4)_2$ to form a homogeneous compound.

It is obvious that one skilled in the art may make many variations in the proportions, ingredients, temperatures, time or pressures as given and still be within the scope of this, my new discovery. For what I claim and desire to protect through grant of Letters Patent is:

1. Process of producing pigments, containing titanium, of a substituted alkaline earth titanate type in which the alkaline earth oxide material of the titanate is replaced by an alkaline earth sulphate material, which process consists in heating a titanium compound and alkaline earth material in molecular proportions with sulphuric acid in the amount required by theory to form the acid salt and heating the obtained compound with water so as to convert it to titanium dioxide and the sulphate of the alkaline earth and roasting this molecularly proportioned material to give a further degree of chemical homogeneity to the final product.

2. Process of producing pigments, containing titanium, of a substituted alkaline earth titanate type in which the alkaline earth oxide material of the titanate is replaced by an alkaline earth sulphate material, which process consists in heating a molecular mixture of alkaline earth material comprising calcium sulphate and a titanium oxide containing material with sulphuric acid in slight excess over that required by theory to form the acid salt $CaSO_4 \cdot HSO_4 \cdot Ti(SO_4)_2$ then treating the mass with water and heating to cause hydrolysis thus forming a molecularly proportioned precipitate of calcium sulphate and titanium dioxide and roasting to give a further degree of chemical homogeneity to this molecularly proportioned product.

3. Process of producing pigments, containing titanium, of a substituted alkaline earth titanate type in which the alkaline earth oxide material of the titanate is replaced by an alkaline earth sulphate material, which process consists in heating a molecular mixture of alkaline earth material comprising a calcium sulphate and barium sulphate containing mixture in which the calcium and barium sulphates are in as nearly as possible molecular proportions with each other and titanium basic sulphate with sulphuric acid in quantity approximately equal to that required by theory to form the mixed acid compound $2BaSO_4 \cdot CaSO_4 \cdot 4Ti(SO_4)_2 \cdot 3H_2SO_4$, hydrolyzing this compound with water and roasting the complex precipitate so formed to cause at least partial sintering of the product.

4. Process of producing pigments, containing titanium, of a substituted alkaline earth titanate type in which the alkaline earth oxide material of the titanate is replaced by an alkaline earth sulphate material, which process consists in heating a molecular mixture of alkaline earth material comprising barium carbonate and titanium nitride in molecular proportions with sulphuric acid to form a compound of the approximate composition $2BaSO_4 \cdot 3Ti(SO_4)_2 \cdot 2H_2SO_4$ and heating said compound with water to form the complex precipitate $2BaSO_4 \cdot 3TiO_2$ and heating said mixture to form a compound $2BaSO_4 \cdot 3TiO_2$.

5. As new compositions of matter the compounds of the alkaline earth sulphates with titanium dioxide of a substituted alkaline earth titanate type in which the alkaline earth oxide material of the titanate is replaced by an alkaline earth sulphate material such compounds being dense white pigments.

6. As a new composition of matter the calcium compound of $CaSO_4 \cdot TiO_2$ formed by heating a molecular mixture of $TiO_2$ and $CaSO_4$ obtained by chemical decomposition of the salt $CaSO_4 \cdot Ti(SO_4)_2$ containing about one mol of $H_2SO_4$.

7. As a new composition of matter the barium compound $2BaSO_4 \cdot 3TiO_2$ formed by heating a molecular mixture of titanium dioxide and barium sulphate as obtained by the hydrolytic decomposition of a sulphuric acid containing compound of the approximate composition $2BaSO_4 \cdot 3Ti(SO_4)_2 \cdot H_2SO_4$.

8. As a new composition of matter the barium calcium titanium compound $$2BaSO_4 \cdot CaSO_4 \cdot 4TiO_2$$

being a dense white pigment having a specific gravity of about 4.0 and being formed by sintering a molecular mixture of titanium dioxide, barium sulphate and calcium sulphate obtained by the hydrolysis of an acid containing compound of the approximate composition $2BaSO_4 \cdot CaSO_4 \cdot 4Ti(SO_4)_2$ with 3 molecules of sulphuric acid.

FOORD VON BICHOWSKY.